Nov. 7, 1933.    R. C. ANGELL ET AL    1,934,025
MANUFACTURE OF FLEXIBLE SHAFTING
Filed March 11, 1931    10 Sheets-Sheet 10
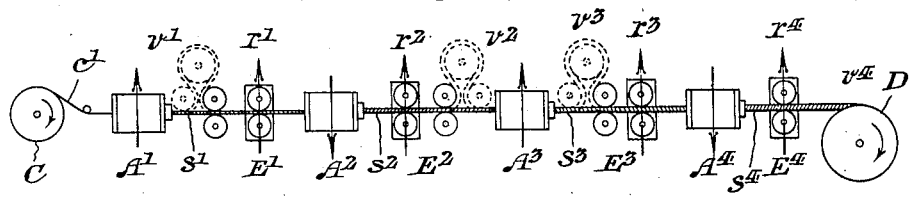
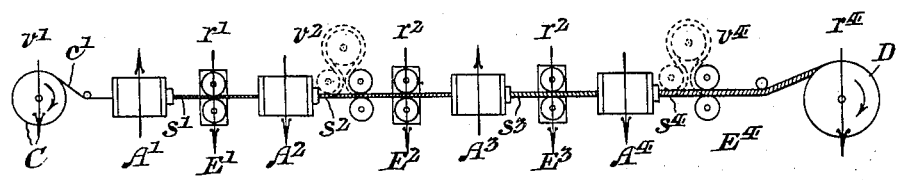
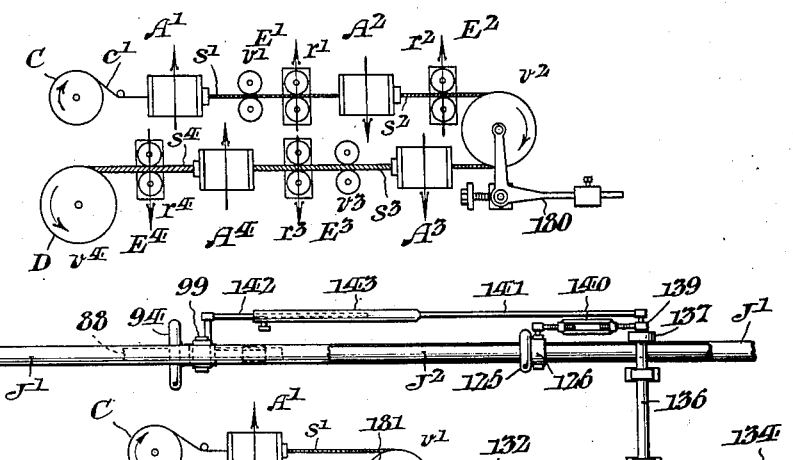
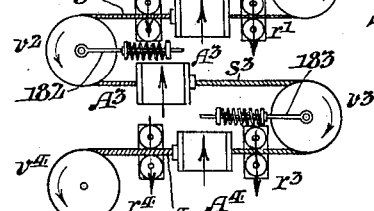

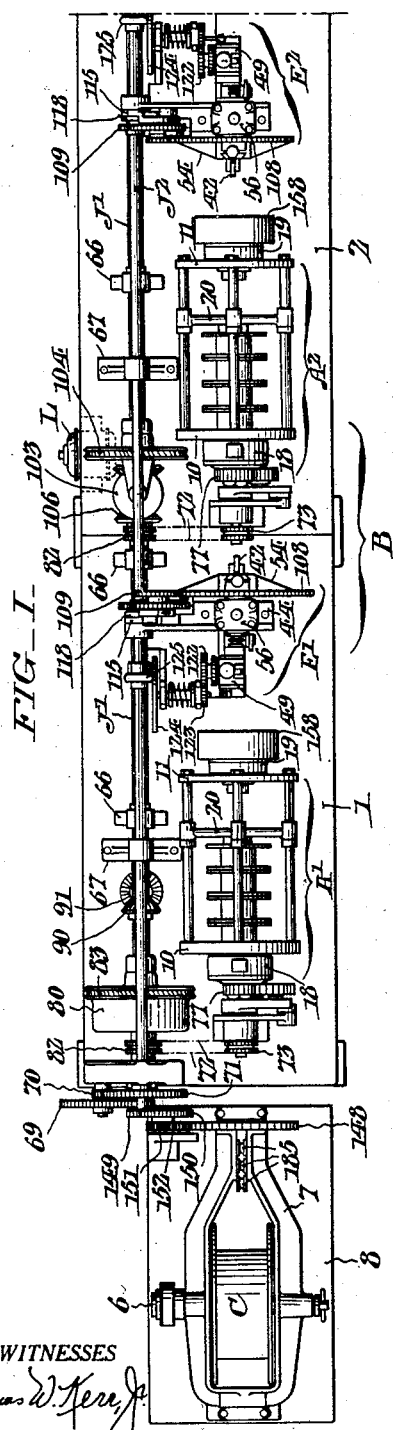

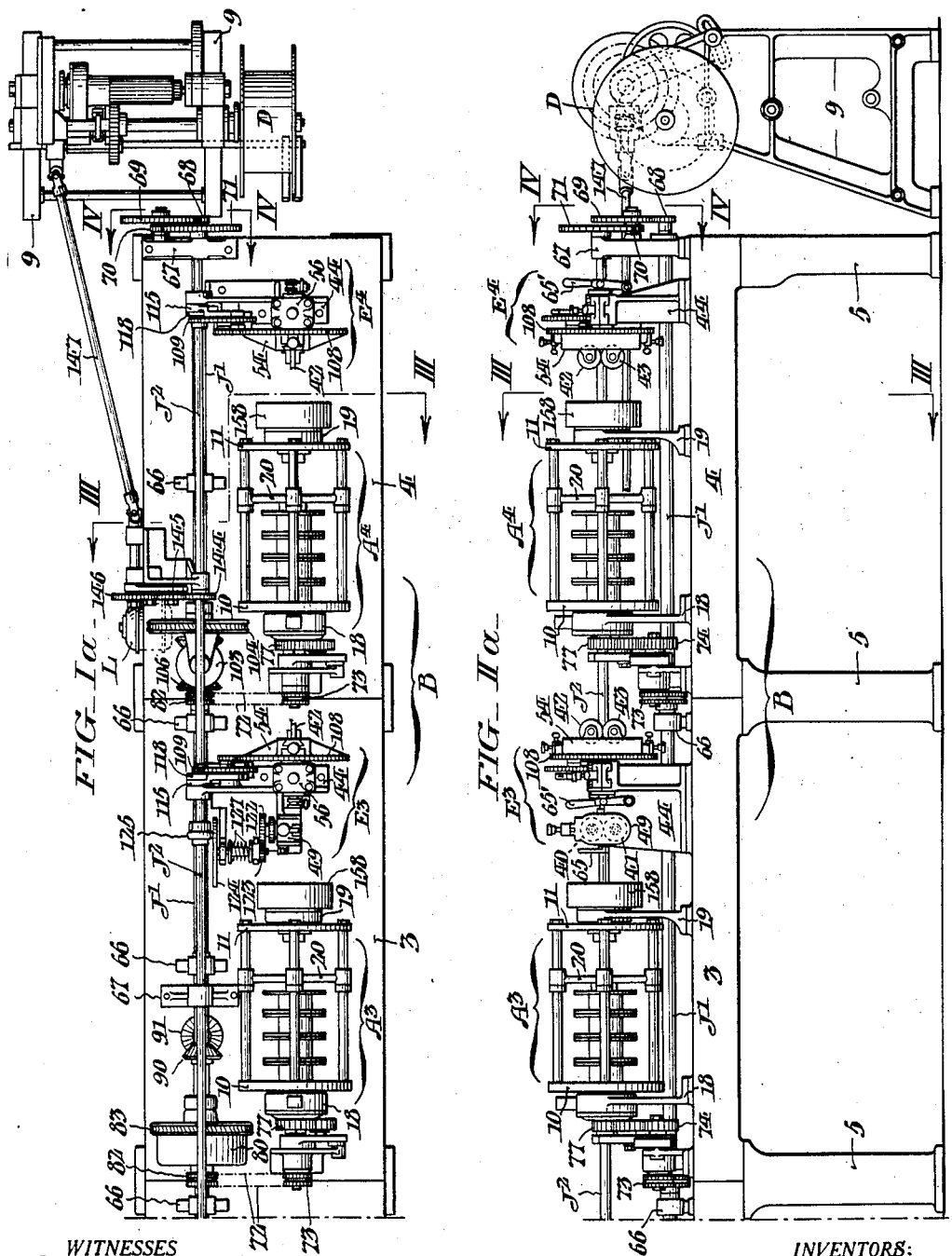

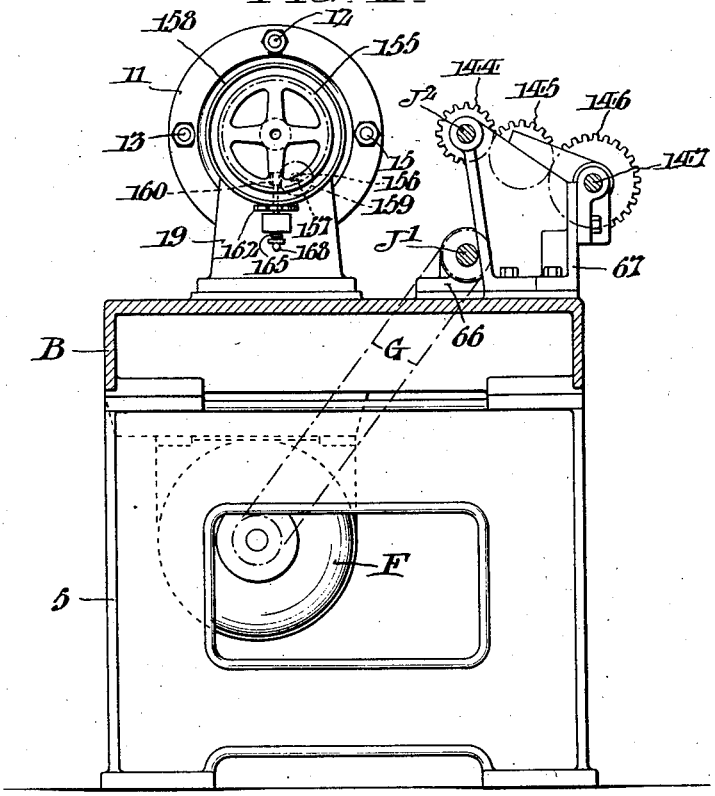

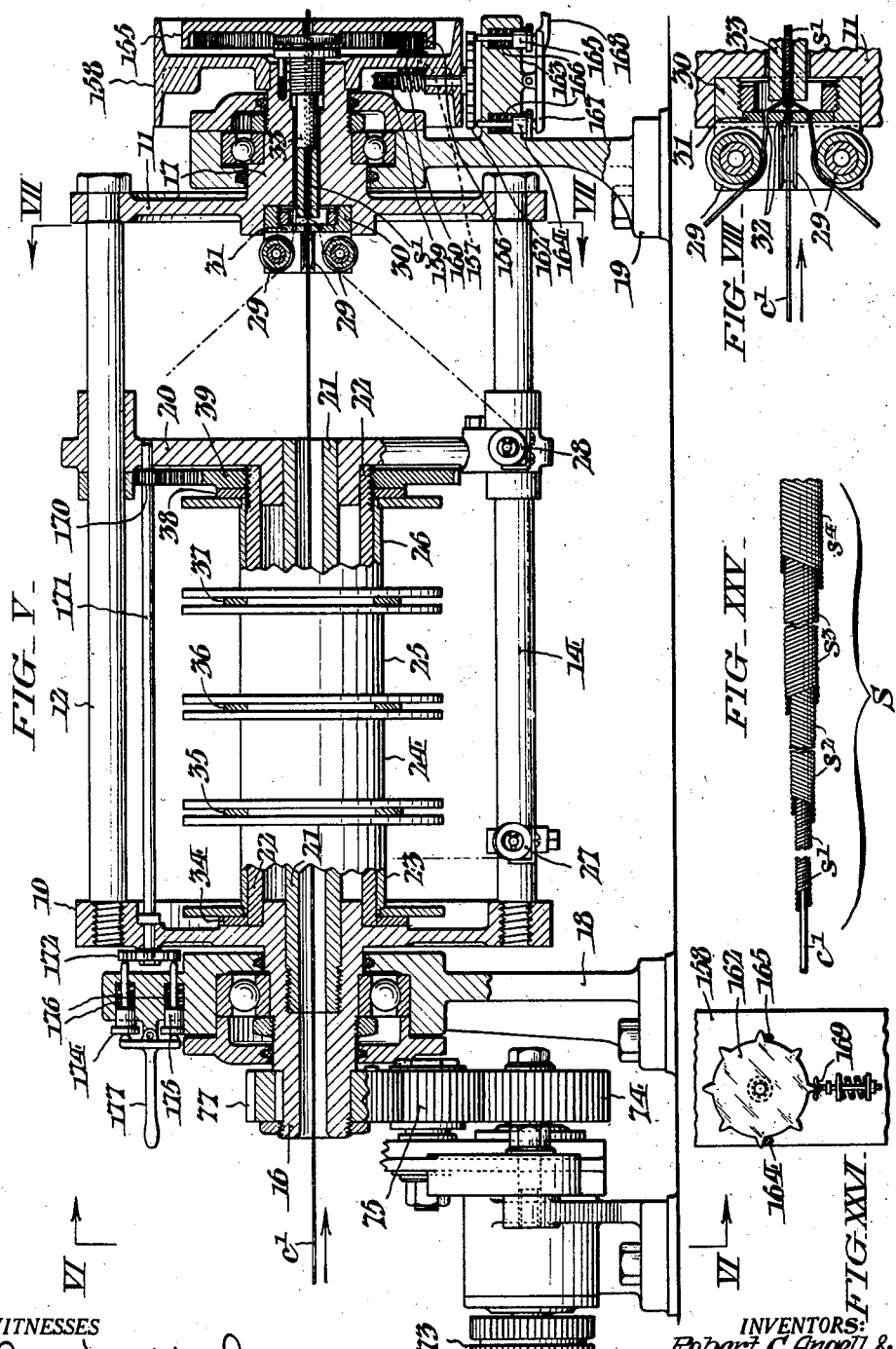

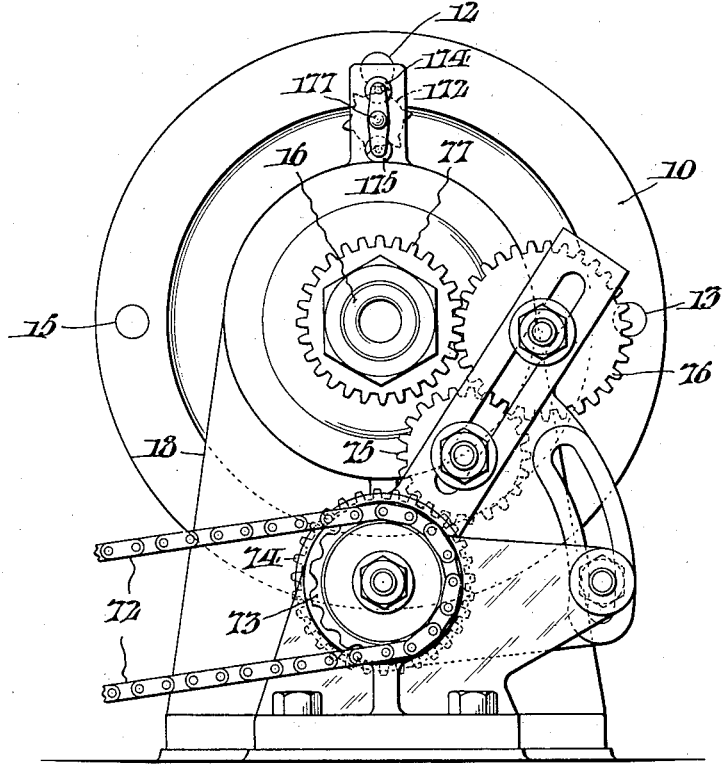
FIG. VI.
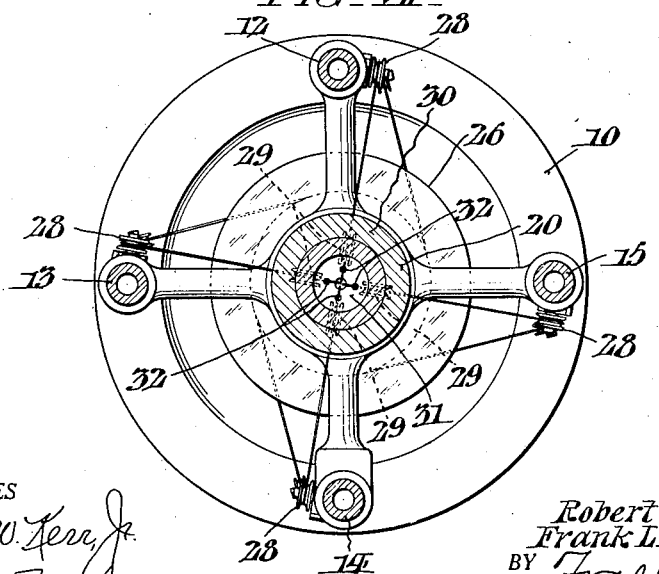
FIG. VII.

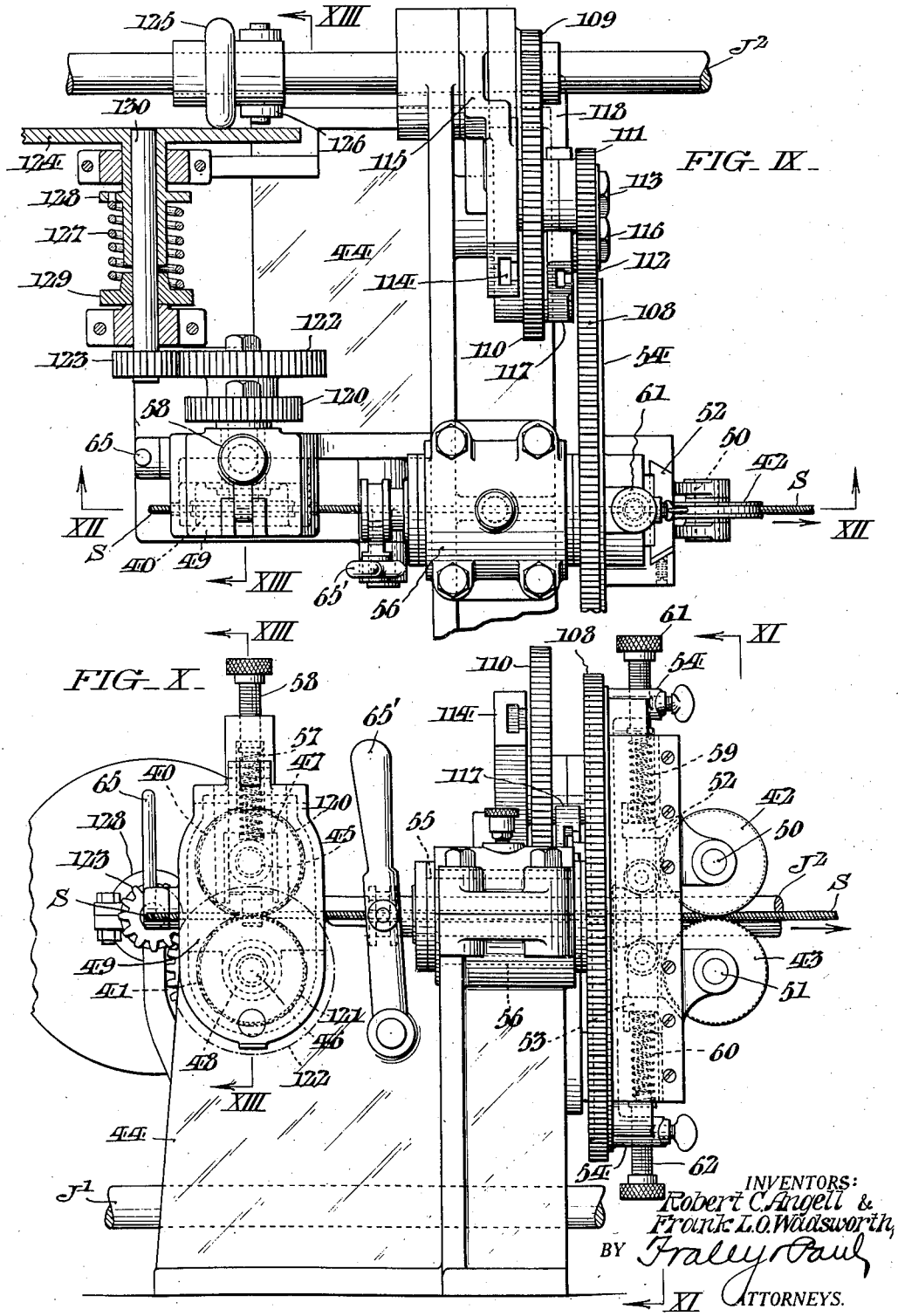

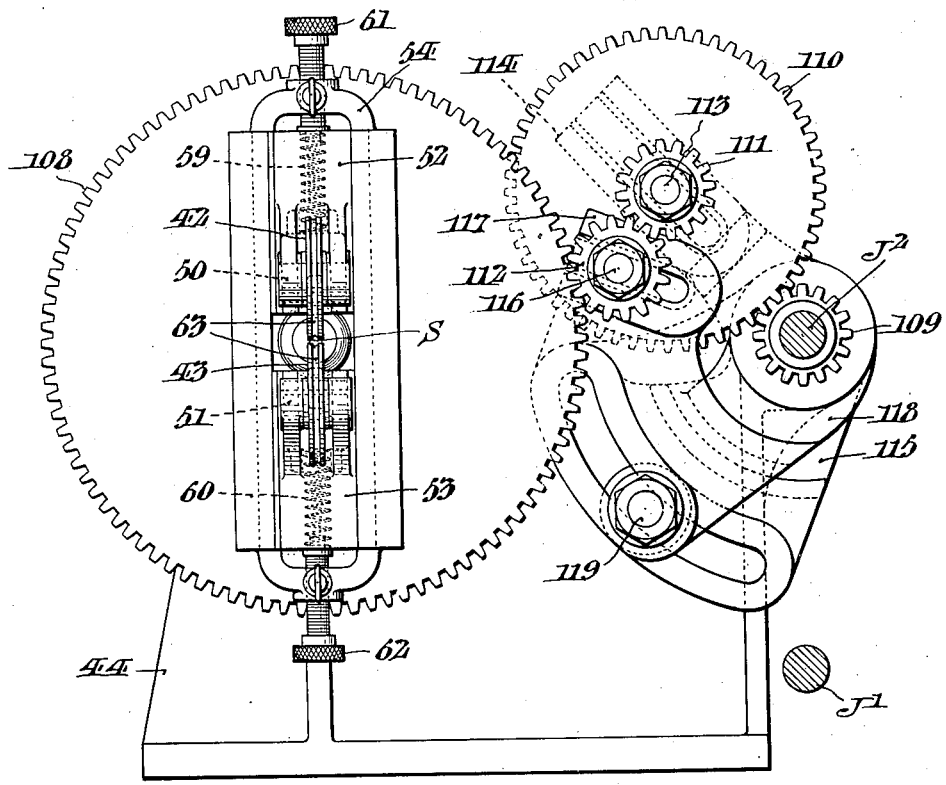
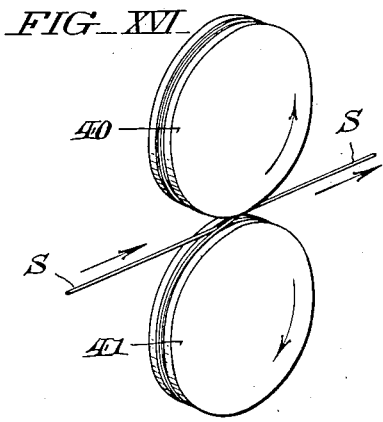
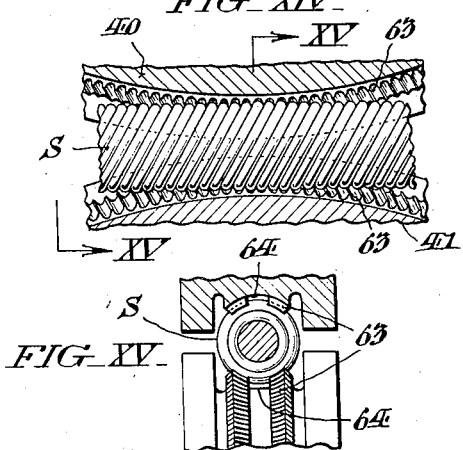
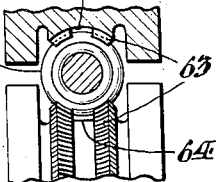

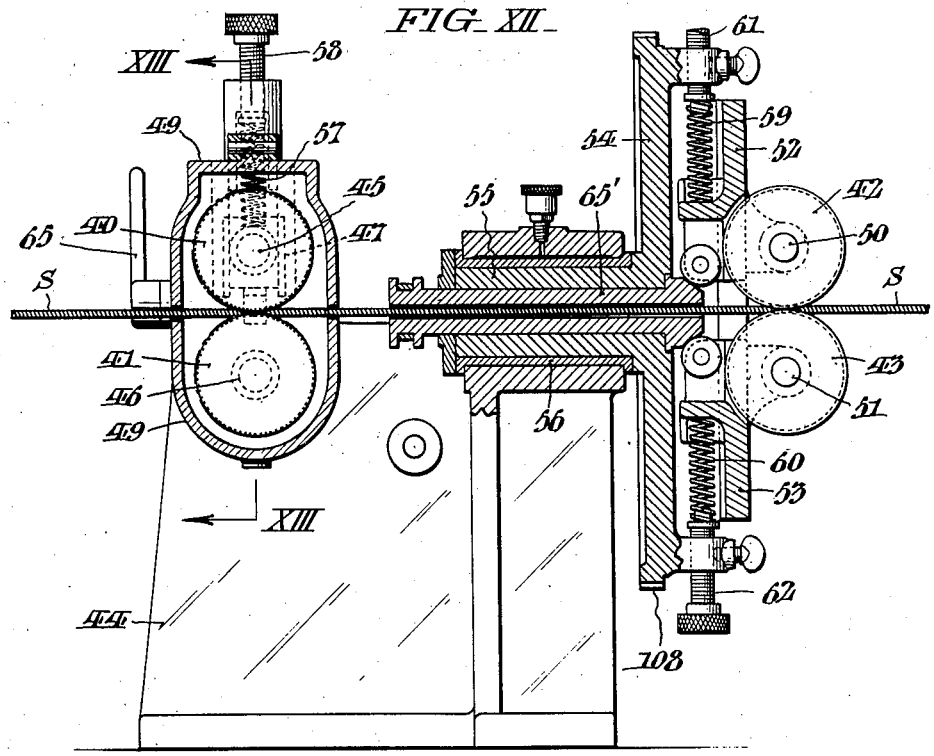
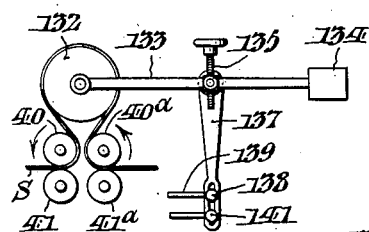
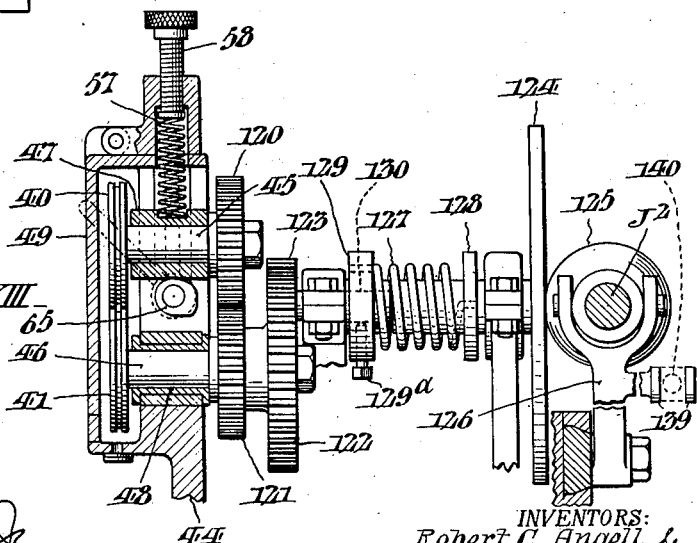

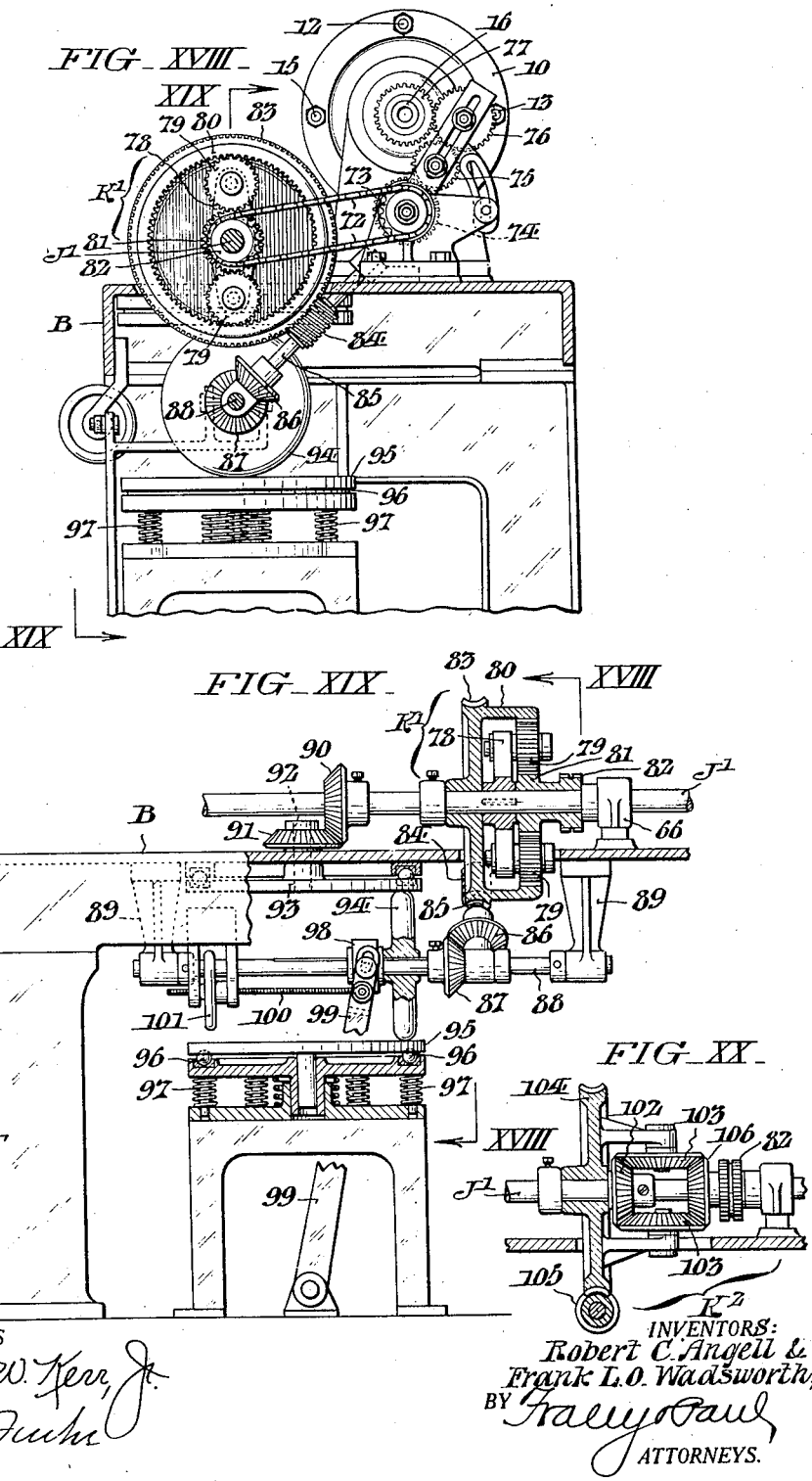

Patented Nov. 7, 1933

1,934,025

UNITED STATES PATENT OFFICE 1,934,025

MANUFACTURE OF FLEXIBLE SHAFTING

Robert C. Angell, Prince Bay, N. Y., and Frank L. O. Wadsworth, Pittsburgh, Pa., assignors to The S. S. White Dental Manufacturing Company, Philadelphia, Pa., a corporation of Pennsylvania Application March 11, 1931. Serial No. 521,634

24 Claims. (Cl. 117—20)

Our invention relates to the manufacture of continuous or unbroken lengths of flexible shafting, which comprises a central core body and a series of superimposed wire layers concurrently wound thereon in progressive order; and one of the main objects of our improvements is to provide a method and apparatus for the rapid and economical fabrication of this shafting, in such manner that the initial stresses and strains, and the initial radial compression, imposed on the successively applied wire layers, during the winding operations, are so far balanced or reduced as to obtain a product that will not kink or twist when it is delivered from the machine, and will not have any substantial amount of internal frictional resistance to bending or to rotation when it is used in a curved condition to transmit a driving torque from one end to another. Our present invention achieves this object by arranging a series of winding units in tandem relationship, and operating them in synchronized correlation to concurrently apply a series of successively superimposed wire layers to the underlying body; and then to subject each wire layer, immediately after it is wound, and immediately preceding the application of the succeeding layer thereto, to a "recoiling" operation by which all of the superimposed shaft elements are simultaneously twisted in a direction opposite to that in which the last layer has been applied, and the inner diameter of the said outside layer is thereby enlarged by a definite and predetermined amount with respect to the subjacent layer; and by which the torsional and compression stresses and strains of winding are relieved immediately after they are imposed on the material, and before they have had time to induce permanent alterations in the physical characteristics of the wire elements.

Another important feature of our present invention is the provision of means whereby all of the important factors which regulate and determine the desired characteristics of the finished shaft may be individually controlled during the progressive winding of the several superimposed wire layers, in order that these co-operative and correlative actions may be properly balanced, or equalized one with respect to the others, for the purpose of most quickly and effectively obtaining the desired results. These individual controls or adjustments are preferably made without interrupting the operation of any part of the fabricating mechanism; and another important object of our invention is to so construct and arrange the various operating parts that these "running adjustments" can be made at any time without stopping the apparatus.

Other purposes and objects of our invention, and other advantages of our improved apparatus for the practice thereof, will be made apparent, to those skilled in this art, by a consideration of the various alternative forms of construction that are illustrated in the accompanying drawings, in which:

Figs. I and Ia, taken together show a general plan view of one form of our improved apparatus;

Figs. II and IIa, taken together, show a general side elevation of this same apparatus;

Fig. III is a cross sectional view of the apparatus on the plane indicated by the arrows III—III of Figs. Ia and IIa;

Fig. IV is an end elevation of a portion of the driving gear mechanism, as indicated by the arrows IV—IV in Figs. Ia and IIa;

Fig. V is an illustration, partly in side elevation and partly in longitudinal section, of one of the winding units of this first form of apparatus;

Fig. VI is an end elevation of this winding unit as indicated by the arrows VI—VI in Fig. V; and Fig. VII is a cross sectional elevation of the same winding unit on the plane indicated by the arrows VII—VII in Fig. V;

Fig. VIII is an enlarged longitudinal sectional view of a portion of one of the winding unit heads, showing the manner in which each layer of strand wire is applied to the underlying core body of the shafting;

Fig. IX is an enlarged plan view showing one of the recoil units for "backing off" each of the layers of wire after it has been wound on the underlying core body;

Fig. X is a side elevation of this unit shown in Fig. IX;

Fig. XI is an end elevation of this same recoil unit as viewed from the direction indicated by the arrows XI—XI in Fig. X; and Fig. XII is a longitudinal sectional elevation of the recoil unit on the plane indicated by the arrows XII—XII in Fig. IX;

Fig. XIII is a detail sectional view of a portion of the recoil mechanism on the plane indicated by the arrows XIII—XIII of Figs. IX, X, and XII;

Fig. XIV is an enlarged sectional view, showing a modified type of roll mechanism which may be used in lieu of the type shown in Figs. IX—XII;

Fig. XV is a cross sectional view on the plane indicated by the arrows XV—XV of Fig. XIV;

Fig. XVI is a perspective view illustrating another alternative form of roll mechanism that can be employed in conjunction with one or more of the recoil units;

Fig. XVII is a diagrammatic side elevation showing still another form of roll assembly which may be substituted for the assemblies illustrated in Figs. XI—XVI inclusive;

Fig. XVIII is a cross sectional view of a portion of the apparatus shown in Figs. I—IIa, and illustrates a differential gear mechanism employed for regulating the speed of each winding head; and Fig. XIX is a partial sectional elevation of this same differential gear mechanism on the plane indicated by the arrows XIX—XIX of Fig. XVIII;

Fig. XX is another detailed sectional view, showing an alternative form of differential gearing which may be employed in connection with the mechanism illustrated in Figs. XVIII and XIX;

Figs. XXI-XXIV inclusive are diagrammatic views showing various ways in which the several winding and recoil units of our improved apparatus may be arranged or combined;

Fig. XXV is a general view of the successive sections of the flexible shafting as produced by the machine;

Fig. XXVI is a fragmentary inverted plan view of a portion of one of the regulating mechanisms, of the winding units; and Fig. XXVII is a semidiagrammatic plan view of means for automatically controlling either the operation of the draft rolls of the recoil mechanism, or the speed of the winding heads—or both—through the action of the tension roll mechanism shown in Fig. XVI.

In the form of construction illustrated in plan and side elevation by Figs. I—Ia and Figs. II—IIa respectively, there are four winding units designated respectively as $A^1$, $A^2$, $A^3$ and $A^4$, which are mounted in tandem or "straightaway" relationship, on a common bed or table B, which is preferably made up of a series of sections 1, 2, 3 and 4, that are rigidly joined together, end to end, and are supported at the ends of each section by suitable columns or floor pedestals 5, 5, 5 etc. At the left hand end of the machine (as viewed in Figs. I—II) there is a core reel or supply bobbin C which is rotatably mounted on a cross shaft 6 that is carried by a U-shaped frame 7. This frame may be supported—in a manner to be presently described—either on a suitable extension of the main bed or base of the machine, or as here shown, on a separate table support 8. At the opposite or right hand end of the apparatus there is a take-up drum or spool D, which is adapted to receive the finished product as it is delivered from the machine, and which is preferably mounted on a separate floor stand 9.

With this arrangement of parts it is possible to make the main bed support of the machine of any desired length—by taking away or adding the proper number of sections and pedestal supports to either end of the apparatus—and thereby permit of the use of any desired number of winding units in tandem relationship.

As illustrated more in detail in Figs. III, V, VI, VII and VIII each of these winding units comprises two heads 10 and 11 which are connected by four longitudinal bars 12, 13, 14, 15, and which are provided with end extensions 16 and 17 that are rotatably mounted in the pedestal bearings 18 and 19. A third head 20 is slidably mounted on the bars 12, 13, 14, 15 and serves to support the outer ends of two concentric tubular shaft members 21 and 22, the opposite ends of which are mounted on, or in, the rear head member 10. The outer tubular member 22 serves to rotatably support four spools or bobbins 23, 24, 25 and 26, which carry the supply of strand wire for the formation of the helical layer which that winding head is adapted to apply to the underlying portion of the flexible shaft structure. The wire from each spool or bobbin is led therefrom over suitable guides; e. g. the rolls 27, 28, 29, to a central winding plate 30, which is detachably mounted in the front head 11 (see Figs. V and VIII). This winding plate may be of any suitable construction, but as here shown, it consists of a hardened steel disk 31 which is provided with four transverse perforations 32 through which the wires that come from the bobbins 23, 24, 25 and 26, are directed to the underbody upon which they are to be wound by the rotation of the head. The front extension member 17 of the head is also provided with an adjustable sleeve 33 whose inner end engages with the wires as they are laid on the underbody; and by moving this sleeve axially in the member 17 the distance between the end of the sleeve and the plate 31 can be varied, for the purposes of changing the angle through which the strand wires are bent as they pass through the perforations 32. This alters the frictional resistance to the movement of these wires, and correspondingly changes the tensions which are imposed thereon as the wires are delivered to, and wound upon, the underbody. This tension on each of the strand wires can be further adjusted by imposing a frictional resistance to the rotation of the bobbins 23, 24, 25 and 26. One way of doing this is to interpose a series of elastically compressible washers 34, 35, 36, 37 and 38 between the adjacent sides of the bobbins and the inner face of the rear head 10, and provide means—such as the threaded collar 39—for varying the pressure on these interposed washers. The friction elements 34 and 38 are respectively held in fixed relation to the head 10 and the collar 39; and the intermediate elements, 35, 36 and 37, are so mounted that they may slide freely on the tubular member 22, but are prevented from rotation with respect thereto; and the pressure which is exerted on the entire system is therefore equally distributed over all of the frictionally engaged surfaces and tends to impose the same amount of drag or retardation on each of the strand wire bobbins 23, 24, 25 and 26.

Each of the winding units $A^1$, $A^2$, $A^3$, and $A^4$ has cooperatively associated therewith a recoil unit ($E^1$, $E^2$, $E^3$ and $E^4$) which is positioned in close proximity to the delivery end of the corresponding winding head.

The first three of these recoil units ($E^1$, $E^2$, and $E^3$) are of the same general construction and a description of one will suffice for all. As indicated in Figs. I—Ia—II—IIa, and as illustrated in greater detail in Figs. IX to XIII, inclusive, each unit comprises two pair of "holding" rolls or "vise" rolls, 40—41, and 42—43, which are both mounted, in spaced relationship, on the pedestal block 44 of the recoil assembly. The rolls 40 and 41 are carried at the ends of the shafts 45—46, which are rotatably mounted in two journal bearings 47—48, that are supported in the U-shaped bracket portion, 49, of the pedestal 44. The rolls 42—43 are rotatably mounted on the short cross pintles 50—51 which are carried in the projecting lug portions of the journal blocks 52 and 53; and these blocks are in turn supported on a cylindrical head 54 which is provided with a tubular shaft extension 55 that is revolvably mounted in the bearing member 56 of the pedestal 44. The two vise or holding rolls 40 and 41 (which are hereafter referred to as the vise rolls "v") are held in pressure engagement with that portion of the fabricated shaft, S, which is passing between them, by means of a spring, 57, which bears on the upper movable journal box 47, and the tension of which can be adjusted by the screw 58; and the rolls 42 and 43 (hereafter designated as the rolls "r") are similarly held in engagement with the said shaft by means of springs 59 and 60, which bear on the journal blocks 52 and 53, and whose tensions can be adjusted by the screws 61 and 62. In order to increase the frictional grip of the rolls, 40—41 and 42—43, on the shaft section, S, and thus prevent any relative angular movement, or rotation, of the engaged surfaces, the peripheral grooves in these roll members may be provided with easily renewable linings 63 of cadmium, or Babbitt metal or soft brass—of less hardness than the wire layers on the shaft S— or the faces of these grooves may be knurled, or cut with helical teeth—to correspond with the spirally wound wire surface of the fabricated product—as shown in Figs. XIV and XV. In both cases it is desirable to relieve or cut back the central portion of the roll grooves—as indicated, for example, at 64 in Fig. XV—in order to avoid an undue amount of relative axial slip between different circumferential elements of these grooves and the circular shaft section with which they engage. Each pair of rolls ("v" and "r") is also provided with means—such as the manually operable cams, 65 and 65', for lifting the roll surfaces out of engagement with the shaft, and thus permit the latter to pass freely through the recoil unit.

Another way in which the holding power of the rolls on the shaft may, if necessary, be increased is shown in Fig. XVI. In this case the shaft section, S, is passed completely around both rolls 40 and 41 (or 42—43), in the direction indicated by the arrows, and emerges from the roll assembly in the direction, and in the line, in which it entered. When this arrangement is employed the peripheral grooves in the rolls are preferably of rectangular cross section and have a width which is at least twice the diameter of the shaft section.

It will be apparent that the rolls 40 and 41, which are carried by the journal boxes 47 and 48 are only capable of rotation in their own plane; but that the rolls 42 and 43 which are carried on the revolvable head 54 can rotate freely on their own axes and may also be revolved, as an assembly, around the axis of the shaft section S with which they are engaged. With this arrangement the fabricated product is positively held against rotation at the point where it passes between or around the axially stationary pair of vise rolls, (v); and the revolution of the second roll assembly (r), in its pedestal bearing 56, positively twists or turns that portion of the shaft between the two pairs of rolls in the same direction in which the second roll assembly is revolved, and thus effects a definite and determinate recoiling, or partial uncoiling, of the last applied layer.

The end recoil mechanism $E^4$ is similar in construction to the recoil mechanism $E^1$, $E^2$, $E^3$ just described with the exception that it does not contain a pair of vise rolls corresponding to the rolls 40—41; the function of these rolls being performed, in this final stage of the fabrication, by the axially stationary take-up spool D.

The construction of the frames, on which the pay-off reel, C, and the take-up spool, D, are mounted, are similar to those used on other types of machines of this character, and as it forms no part of or present invention it will not be specifically described.

The power for driving all the parts of the mechanism which have been heretofore described is conveniently derived from a motor F, which is mounted on the bed frame near the center of the machine, and which is coupled by means of a belt or flexible chain G to a jack shaft or countershaft $J^1$ which extends the entire length of the machine, and is supported at suitable intervals by means of two sets of pedestal bearings 66—67, etc. One set of these pedestals 67 also carries a second smaller jack shaft $J^2$ which is mounted above the shaft $J^1$ and is driven therefrom—at each end of the machine—by a train of reduction gears 68, 69, 70 and 71 (see Fig. IV). The lower jack shaft serves to drive the winding heads $A^1$, $A^2$, $A^3$ and $A^4$; and the upper jack shaft is used to actuate the movable elements of the recoil mechanisms $E^1$, $E^2$, $E^3$ and $E^4$, and of the take-up spool D; and may also be used if desired to revolve the frame 7 of the pay-off or core reel C.

Each winding head is operatively connected with the high speed jack shaft $J^1$ by means of the differential gear mechanism, $K^1$ or $K^2$ which is shown in Figs. XVIII, XIX and XX, and which serves, in turn, to drive the sprocket chain and gear members 72, 73, 74, 75, 76 and 77 (see Fig. VI), at a variable and controllable speed, which can be altered, at the will of the operator, while the machine is in operation. This result is effected in the following manner:

In the construction shown in Figs. XVIII and XIX the differential gear mechanism $K^1$ comprises a two-armed spider member 78 which is keyed or otherwise secured to the jack shaft $J^1$ and which carries two pinions 79 that are rotatably mounted on the outer ends of this spider; an internal annular gear 80 which is mounted for free rotation on the jack shaft $J^1$ and which is engaged with the pinions 79—79; and a spur gear 81 which is also mounted for free rotation on the jack shaft and which is likewise connected with the said pinions 79—79. This spur gear 81 carries a sprocket wheel 82 that drives the sprocket chain 72 previously referred to. The periphery of the annular gear member 80 is provided with worm wheel teeth 83 that are engaged by a worm 84 which is mounted on the inclined shaft 85; and the lower end of this shaft is provided with a bevel gear 86 which engages with a corresponding gear 87 on the horizontal shaft 88 that is rotatably mounted just below the jack shaft $J^1$ in the hangers 89, 89. The jack shaft $J^1$ is also provided with a bevel gear 90 which engages with the bevel gear 91 on the upper end of a short vertical shaft 92 that is rotatably mounted in a suitable bearing on the bed B of the machine. The lower end of the shaft 92 carries a friction disk 93, which is adapted to engage with the rounded peripheral edge of a friction wheel 94 that is slidably mounted on the shaft 88. The friction gear elements 93 and 94 are held in pressure engagement with each other by means of an idler disk 95 which is supported on a ring of ball bearings 96 and is pressed upwardly by the ring of compression springs 97, 97, etc.

The hub of the friction gear wheel 94 is engaged by a loose collar 98 that is connected to the upper end of a rocking lever member 99, and can be moved axially of the shaft 88 by means of the screw and hand wheel 100, 101.

When the friction gear member 94 is brought into line with the center of the shaft 92, it will remain at rest; and the annular gear member 80 will be locked in fixed position by the engagement of the worm and worm gear elements 83 and 84. Under these circumstances the rotation of the spider 78 with the jack shaft $J^1$ will cause the spur gears 79—79 to roll around on the interior of the annular gear 80 and impart a still higher speed to the central spur gear 81; and this movement will be communicated in turn—through the sprocket wheel 82—to the train of mechanism that terminates in the spur gear 77 at the end of the winding head member 16; and the said winding head will thus be revolved at a speed dependent upon the relative size of the sprocket wheels and gears 82—73 and 74—77. This speed can be readily changed by removing either the pinion 74, or the gear 77, (or both) and replacing it (or them) with other gears of either larger or smaller diameter; and the direction of rotation of the head may be also readily changed by removing either of the idler gears 75 or 76 and bringing the remaining one of these gears into direct engagement with the end pinion 77 on the winding head shaft.

The changes last described can only be made when the machine is at rest; but the differential gear mechanism $K^1$, which has been above described, permits the operator to alter the speed of revolution of the winding head shaft while the mechanism is in operation. This is done by moving the friction wheel 94 either to the right or left of this central position by means of the hand wheel 101. Any displacement of this wheel from a central position results in either a clockwise or counter-clockwise rotation of the shaft 88 and a corresponding movement of the annular gear 80. The rotation of this gear in either direction results in either an increased or decreased speed of the rotating members 81 and 82; and consequently results in a variation of the speed of the winding head.

The differential gear mechanism $K^2$ which is illustrated in Fig. XX, is of somewhat simpler form than the one shown in Figs. XVIII and XIX. In this alternative arrangement a bevel gear member 102 is secured directly to the jack shaft $J^1$ and is engaged by two bevel gears 103—103 that are rotatably mounted on arms which project from the worm wheel 104. The worm wheel 104 is mounted for free rotation on a jack shaft $J^1$ and is engaged by a worm 105 which is secured to the shaft of an independent motor, L, that is suitably supported on the bed plate B of the apparatus (see Figs. I and Ia). The bevel gears 103—103 are engaged with another bevel gear 106 which is also mounted for free rotation on the jack shaft $J^1$ and which carries at its outer end the gear sprocket wheel 82 that drives the sprocket chain 72. When the motor L is at rest the worm gear 104 will be held against rotation; and the inter-connected gears 102—103 and 106 will drive the chain sprocket 82 at the same speed, but in the opposite direction, as that of the shaft $J^1$. When the motor L—which should be a reversible variable speed motor—is operated, the resultant movement of the gear 104 will either increase or decrease the speed of the connected gear members 82—106 and correspondingly change the speed of rotation of the winding head.

Either of the above described differential gear mechanisms may be used in conjunction with all of the winding units $A^1$, $A^2$, $A^3$, or $A^4$, or (as shown in Figs. I and Ia), one of these differential gear mechanisms (e. g. $K^1$) may be used in conjunction with the winding units $A^1$ and $A^3$, and the alternative differential mechanism $K^2$ may be used in conjunction with the remaining heads $A^2$ and $A^4$.

The gear mechanism which we employ for operating the various parts of the recoil units $E^1$, $E^2$, and $E^3$ is illustrated in Figs. IX, X, XI, XII and XIII. The head 54, that carries the rolls 42—43 (r), forms a part of the spur gear 108, which is connected to the pinion, 109, on the slow speed jack shaft $J^2$ by means of the intermediate change gears 110, 111 and 112. The gears 110 and 111 are mounted to revolve together on a common stud shaft 113, which is clamped in the slotted arm 114 of a swinging bracket 115; and the idle transmission pinion 112 is revolvably supported on the stud shaft 116, which is clamped in the slotted arm, 117, of a second swinging bracket 118,—the parts being all held in proper assembled position by a single clamp bolt 119. By changing the relative size of the two gears 110 and 111 the revolving recoil head 54 may be positively driven at any desired speed (so as to produce a definite and predetermined rotation of the flexible shaft section S which lies between the two sets of gripper rolls $v$ and $r$ (40, 41 and 42, 43)); and the direction or rotation of the said head may be reversed by removing the idle transmission pinion 112, and swinging the gear 111 into engagement with the gear 108.

The vise rolls $v$ (40 and 41), may or may not be positively driven. If the shafts 45 and 46, on which these rolls are supported, are mounted to rotate freely in their journal bearings, the said rolls will be moved solely by the progressive travel of the shaft section S through the apparatus;—this movement being effected by the pull that is exerted on the fabricated product as it is wound up on the take-up spool D. But we have provided means whereby these rolls may be frictionally driven at a variable predetermined speed, and may thus serve to not only positively hold the portion of the shaft S which is in engagement therewith against rotation, but to also control or regulate either the progressive movement of successive sections of the shaft through the series of winding heads, or to adjustably vary the draft or axial pull on each of the said sections. In the form of construction shown, this controllable draft action is obtained by providing the shafts 45 and 46 with intermeshing gears 120, 121, and connecting the lower gear 121 with the jack shaft $J^2$ through the train of driving elements 122, 123, 124 and 125. The first two of these elements (122—123) are preferably made in the form of spur gears; but the last two elements (124 and 125) are preferably frictionally engaged members of the same general character as those shown in Fig. XIX. The driving disk 125, which is slidably mounted on the jack shaft $J^2$, is held in position between the forked ends of a block, 126, and can be adjusted to any desired position radially of the friction disk 124 by sliding this block longitudinally in its support on the bed of the machine (see Fig. XIII). The friction disk 124 is held in elastic pressure engagement with the edge of the member 125 by means of a compression spring 127 which is interposed between a collar 128 on the hub of the disk 124 and a sleeve 129 that is adjustably secured to the shaft 130 by means of the set screw 129ª. The disk 124 is not secured rigidly to the shaft 130 but is connected thereto by securing one end of the spring 127 to the collar 128 and securing the other end thereof to the adjustable collar 129, so that the said spring 127 acts as a yielding or elastic torque connection between the driving and the driven elements 125 and 123.

This arrangement of driving mechanism for the vice rolls $v$ (40 and 41) permits the said rolls to be elastically driven at any desired speed—by adjusting the friction disk 125 radially of the friction disk 124—; and also permits this speed to be altered while the machine is in operation, so as to compensate, if necessary, for any variations in the speed of travel of the shaft sections between successive vise rolls, (e. g. such as may be due to stretching of these sections under the winding operations). The independently variable speed control of the draft rolls (40, 41), acting in conjunction with the elastic torque connection between the driving elements 123 and 124, also results in taking up any momentary variations in the travel of the fabricated product, and in maintaining a separately regulatable axial pull or tension on each of the several successive sections of the fabricated shaft.

The maintenance of a yielding and independently controllable tension on the successive sections of the fabricated product may also be secured by such an arrangement of draft rolls as is diagrammatically illustrated in Fig. XVII. In this construction each vise roll assembly comprises two pair of axially stationary holding rolls, 40, 41, and 40ª, 41ª, and an intermediate offset tension roll 132. The necessary draft or pull is applied to the shaft section by driving the pair of vise rolls 40ª, 41ª by the same gear system as is shown in Figs. IX to XIII, save that the elastic torque connection between the elements 123 and 124 may in this case be omitted. The shaft section S is passed around the roll 40 and up over a larger tension roll 132, and thence down again around the roll 40ª from which it passes in the same direction and the same line in which it approached the roll 40.

The tension roll 132 is mounted on the end of a lever 133 which is pivoted near its center and is provided at its opposite end with an adjustable weight 134. The action of this weighted-pulley-lever system on the looped portion of the shaft with which it is engaged maintains a substantially uniform predetermined tension in this section when the axial speed of movement of the fabricated product momentarily increases or decreases. If this variation in the rate of progression of any particular shaft section becomes excessive the range of action of the tension equalizer elements 132, 133, 134 may be increased to any extent desired by mounting the central pivot of the lever 133 on an adjustable support which can be raised or lowered in any suitable manner—as for example, by the screw 135.

The up and down movement of the yielding tension roll 132 will effect an automatic control or maintenance of a predetermined draft or pull on that portion of the fabricated product which is approaching the said roll—this predetermined draft being adjustably regulatable by shifting the position of the weight 134 on the lever support 133; but when the range of this movement is exceeded a manual operation is required to either raise the pivot support of the lever 133, or to change the position of the driving roll 125 on the jack shaft J². The necessity for these manual resetting adjustments can be eliminated by interconnecting the lever 133 and the driving roll 125 so that the movement of the one automatically effects a compensatory movement of the latter. This may be very easily and effectively accomplished by the arrangement diagrammatically indicated in Figs. XVII and XXVII. As there shown the lever 133 is connected to one end of a shaft 136 which is mounted in bearings on the top of the pedestal frame 44; and which provided at its opposite end with a downwardly projecting arm 137, whose lower extremity is slotted to receive an adjustable block 138. This block carries a pintle, or stud pin, connection for one end of a link 139, which is pivotally coupled, at its other extremity, to the sliding block 126 that controls the position of the driving element 125, on the jack shaft J². An upward movement of the tension roll 132—which accompanies an increase in the speed of delivery of the shaft section from the preceding winding unit—therefore produces a clockwise rotation of the lever system 133—137, and a corresponding movement of the roll 125 toward the center of the driven disc 124. This produces, in turn, an increase in the speed of rotation of the draft rolls, 40ª—41ª, which is sufficient to correspond to, and compensate for, the increase in the rate of progression of the product over the tension roll 132. A downward movement of the pulley 132—which accompanies any decrease in the rate of delivery from the preceding winding head—will result in a corresponding decrease in the speed of rotation of the draft rolls 40ª, 41ª. In order to permit interconnected parts to be initially set for any desired normal speed of operation the link 139 can be lengthened or shortened by means of the turnbuckle connection 140.

When the rate of delivery of any one shaft section, from any one winding unit, is altered, the number of turns of wire per unit length of shaft will be correspondingly changed if the speed of winding (i. e. the rate of revolution of the winding head) is not correspondingly adjusted. This adjustment can be made manually by the hand wheel 101 of the differential speed control system K¹ (see Fig. XIX), or by an equivalent variation of the motor speed of the alternative system K² (see Fig. XX). But it is highly desirable and advantageous to also provide for an entirely automatic adjustment of winding speed—to correspond to variations in the progressive movement of different sections of the shaft—and this can be done by providing the lever 137 with a second adjustable pintle block connection 141, which engages one end of a second link 142 that is coupled at its opposite extremity to the lever 99 of the differential speed drive K¹,—the screw 100 being in this case disconnected from the said lever. When these interconnected parts are properly set for normal operation—(by adjusting the position of the pintle block 141 in the slotted arm 137, and by adjusting the length of the link 142 by the sleeve connection 143)—any variation in the speed of delivery of the wound product from one of the winding heads will be accompanied by an upward or downward movement of the weighted tension pulley 132; and this, in turn, will shift the roll 94 in such direction as to correspondingly vary the speed of the said head, and thus maintain a substantially constant spacing between the successive or adjacent turns of the wire layer applied thereby.

Either one of the automatic control adjustments last described may, of course, be used independently of the other, or both may be used conjointly, as the conditions of operation, in the production of any given character of product, may require.

As shown in Figs. Ia and III the take-up reel D is driven from the upper slow speed jack shaft $J^2$ by means of the train of gears 144, 145, 146, the latter of which is connected to a shaft 147 that runs to the driving mechanism of the take-up spool assembly. As previously stated this latter assembly is of the usual construction employed in similar apparatus, and as understood by those skilled in this art, this take-up mechanism is so designed as to impose any desired and predetermined pull on the fabricated shaft as it is wound up on the spool D.

We have also made provision for positively rotating the frame 7, which carries the pay-off reel C, upon an axis which is parallel to, and preferably coincident with, the axes, or the common axis, of rotation of the winding units $A^1$, $A^2$, $A^3$, $A^4$. In order to accomplish this purpose the forward end of the frame 7 is provided with a large gear wheel 148; and this gear is operatively connected to a pinion 149 on the end of the jack shaft $J^2$ by a train of spur gears 150, 151 and 152, similar in all respects to the corresponding train 110, 111 and 112 that is employed to transmit movement to the revolving head 54 of one of the recoil units (see Figs. XI, XII and XIII). The use of such a train of gears allows the core reel frame 7 to be revolved in either direction and at any desired speed. In the usual operation of this machine the frame 7 is held stationary; but if it is desired to impart a definite initial twist to the core wire before the first winding is laid thereon by the unit $A^1$ the core reel may be revolved, as above stated, in such a direction as to either twist the core wire in the same direction in which it is afterward twisted by the action of the recoil unit $E^1$, or in the opposite direction.

It is also desirable and advantageous to provide means by which the tensions imposed on the strand wires, during the application of the successive layers by the winding units $A^1$, $A^2$, $A^3$, and $A^4$, may be individually or separately controlled and adjusted—for each winding unit—while the machine parts are in normal continuous operation. This may be done, in the manner illustrated in Figs. III, V, VI and XXVI. As there shown the head of the threaded sleeve 33—which serves to adjust the tension imposed on the strand wires as they are wound on the underlying section of the shaft—is provided with a large internal spur gear 155, which is engaged by a small pinion 156 that is secured to the end of a short shaft 157. This shaft is rotatably mounted in the web of a pulley shaped member, 158, which is detachably secured to the end of the front journal extension 17 of the revolvable winding head frame, and is provided, at its inner end, with a worm wheel 159 that is engaged by a worm 160 on the shaft 161. The latter shaft is also rotatably mounted in the rim portion of the member 158, and carries at its outer end an eight-tooth star wheel 162. The pedestal 19 is provided with a forwardly projecting boss 163, that carries two vertically movable pins, 164 and 165, which may be raised until their upper ends lie in the circular path of travel of the star wheel teeth—on opposite sides of star wheel center—but which are normally held depressed by the compression springs 166. The lower ends of these pins, 164 and 165, are engaged by the opposite arms, 167, 168, of a short lever, which is pivoted at its central point on the lower side of the boss 163.

When it is desired to adjust the position of the sleeve 33, the lever 167, 168 is rocked on its pivot support—by either pressing down or lifting the projecting end of the arm 168—until one of the pins, 164 or 165, is moved upwardly far enough to engage with the teeth on the star wheel 162. When this is done each revolution of the winding head member, 158, will cause the eight-tooth star wheel 162 to be moved through 45°; and a proportional angular movement will be communicated to the threaded sleeve 33 through the train of reduction gears 160, 159, 156, 155. The speed of revolution of the winding head is relatively high (e. g. about 2000 R. P. M.) and in order to prevent "overthrow" of the star wheel at each engagement of one of its teeth with one of the pins 164 or 165, we provide a spring actuated detent 169, which prevents any tendency to such overthrow—i. e. which limits each angular movement of the star wheel to the angular spacing between successive teeth.

When the pitch of the screw on the threaded sleeve 33, and the reduction ratio 160 to 155, is known, the amount of axial movement of this sleeve—and the corresponding variation in the tension imposed on the strand wires at the point of winding—may be definitely controlled and determined by simply noting the R. P. M. of the rotating winding head, and the length of time during which the lever arm 168 is raised or depressed. The operator of the machine is thus enabled to make an accurate and definite adjustment of the winding tension, or winding pressure, without interrupting the continuous fabrication of the product, and without altering or changing any of the other individually controllable factors of the operation.

It is also desirable and advantageous to provide additional facilities for varying, at will, the tension on those portions of the strand wires which are back of the winding plate 30—31. This can be done by making the threaded collar 39—(which serves to adjust the elastic pressure of the washers, 34, 35, 36, 37 and 38, on the end faces of the strand wire spools 23, 24, 25 and 26, and thereby control the frictional drag on the strand wires that are drawn from these spools)—an integral part of a large spur wheel, which is engaged by a small pinion 170 that is secured to the shaft 171. This shaft 171 is rotatably mounted in the heads 10 and 20 of the revolvable winding frame, and is provided at its outer or rear end, with a six toothed star-wheel 172. The adjacent bearing pedestal, 18, carries two pins, 174 and 175, which are mounted to slide axially in their bearings, and whose inner ends are adapted to engage with the teeth of the star-wheel on opposite sides of its axis. These pins are normally held in retracted position by the compression springs 176—176; but may be selectively advanced by the rocking movement of a double bell crank lever 177. The action of this star-wheel mechanism—in adjusting the position of the collar 39 while the machine is in operation—is the same as the corresponding mechanism for adjusting the winding tension sleeve 33, and does not, for that reason, require further explanation.

It is now apparent that we have provided individual means for adjustably varying and controlling all of the important factors—to wit, the tension under which the wires are wound in each layer; the speed of winding each successive section; the axial draft or pull on each of the said sections; and the amount of recoil in each of the said layers—which conjunctively affect and determine the desired characteristics of the finished shaft; and that the necessary control of sixteen of these factors (four in each of the four winding steps), may be effected, either manually or automatically, without interrupting the normal and orderly progression of the product through the apparatus. We may also individually or separately vary the amount of recoil in each layer, without stopping the machine. This can be done by providing each of the pinions 109, on the jack shaft $J^2$, with a differential speed drive like one of those used in conjunction with the sprocket pinions 82 on the jack shaft $J^1$ (see Figs. XVIII to XX inclusive); and this addition can be made without any alteration or rearrangement of any of the other parts of apparatus. It is also to be noted in this connection that each of the winding units, $A^1$ $A^2$ $A^3$ and $A^4$, is positively connected to the corresponding jack shaft pinion, 82, by the non-slipping train of gears (72 to 77); and that each set of recoil rolls ($r^1$ $r^2$ $r^3$ and $r^4$) is also positively connected to, and driven from, the associated jack shaft pinions 102 (by the spur gear train 110—111—112 and 108); and that the two jack shafts $J^1$ and $J^2$ are also positively interconnected by the spur gears 68 to 71 inclusive; so that, under normal conditions of operation (where the differential gear mechanisms $K^1$ or $K^2$ are either idle or are operated at definite preadjusted speeds), all of the cooperating winding and recoil units are revolved in relatively fixed and unvariable angular relationship, and the resultant radial enlargement of the concurrently wound and concurrently recoiled shaft layers may thus be definitely predetermined and maintained at any desired value. The attainment of this result is of particular importance in the operation of multiple head machines of the character herein described (as contrasted with the use of single stage machines where only one layer of wire is applied at a time), because the portion of the shaft which is formed in one head must pass immediately to the succeeding head—without any intermediate spooling or interval of rest, during which the stressed material may have an opportunity for an internal readjustment or setting of the elastically distorted fibers—and also because the physical properties of the finished shaft which is produced by the concurrent winding of all of its superimposed layers are necessarily more affected by irregular variations in the relative speed of movement of the various coacting parts than is the case where the different radial sections or portions of the fabricated product are assembled at different times and on mechanically independent machines each of which may be individually operated at a different speed.

Our general method of procedure, in fabricating flexible shafting by the concurrent winding of a series of successively superimposed layers of wire on and around a central core, is best illustrated by the semi-diagrammatic drawings of Figs. XXI to XXIV inclusive, which show various alternative forms of apparatus suitable for the practice of our invention. In the arrangement shown in Fig. XXI (which corresponds to that illustrated in greater detail in Figs. II—IIa) the core wire $c^1$ is drawn from a core reel C which is rotatably mounted in a stationary, or non-revolving, frame and then passes in succession through the first winding unit ($A^1$); the first pair of draft or vise rolls ($v^1$); the first pair of recoil head rolls ($r^1$); the second winding head unit ($A^2$); the second pair of recoil head rolls ($r^2$); the second pair of draft rolls ($v^2$); the third winding unit ($A^3$); the third pair of draft rolls ($v^3$); the third pair of recoil head rolls ($r^3$); the fourth winding head ($A^4$); the fourth pair of recoil rolls ($r^4$); and is wound up on the frictionally driven drum D, which serves as the final vise or draft roll element ($v^4$) of the terminal recoil unit $E^4$. The units $A^1$ and $A^3$ both revolve in the same direction about the axis of the core wire (e. g. clockwise); and the units $A^2$ and $A^3$ both revolve in the opposite direction (e. g. counter-clockwise); so that the successive layers of wire are applied in successively reversed right hand and left hand helices. All of the recoil roll head members, $r^1, r^2, r^3$, and $r^4$, revolve in the same direction (e. g. clockwise). The first applied layer, (which together with the core forms the first section $s^1$ of the final product), is "recoiled", or partially uncoiled, as it passes from the first pair of vise rolls, $v^1$, to the first set of recoil rolls $r^1$, which revolve about the axis of the core in the same direction as the unit $A^1$ (e. g. clockwise);—the amount of this uncoiling being of course dependent on the relative speeds of rotation of the two members, $A^1$ and $r^1$. The recoil of the second reversely wound layer (which is applied to the section $s^1$ by the unit $A^2$) is effected by the partial untwisting of this layer between the points where it is engaged by the second pair of recoil roll elements $r^2$—which revolve in a direction opposite to that of the second winding head $A^2$—and the axially stationary vise or draft rolls $v^2$. The recoil of the third layer, which is wound on the section $s^2$ in the same direction as the first layer (e. g. by revolution of the head $A^3$), is effected by the partial untwisting or uncoiling of that portion of the fabricated product which is between the third pair of draft rolls $v^3$ and the associated set of recoil rolls $r^3$. The final recoil action, which follows the application of the fourth layer by the counter-clockwise revolution of the unit $A^4$, is applied to the finished shaft between its points of engagement with the fourth set of recoil roll elements $r^4$ and the take-up drum D, which, as already stated performs the function of the terminal draft roll element $v^4$. It will, of course, be understood that the final recoil effect on each layer; (i. e., the radial expansion of each progressively applied helical coil) is determined by the algebraic sum of all of the twisting actions to which it is subjected—e. g., the final effect on the first applied layer is the result of a partial uncoiling of the helically wound wires between the rolls $v^1$ and $r^1$ plus a reverse coiling up, or negative recoil, of the same wire elements between the rolls $r^2$ $v^2$, plus another partial uncoiling between the rolls $v^3$ $r^3$, and a final negative recoil between the rolls $r^4$ and the take up spool D—and this is another reason why the relative rotary movement of the various recoil members, $r_1$ $r_2$ $r_3$ and $r_4$, abut the axis of fabrication, should be positively controlled (by non-slipping gear trains) in order to obtain and maintain the desired and necessary radial expansion of each successively applied layer.

The following explanation may be made: The action of the recoil rolls $r^1$ affects the recoil of shaft $S^1$ between $r^1$ and $v^1$ and corresponding coiling down (negative recoil) of the first layer between $r^1$ and $v^2$ so that the winding of the second layer on $S^1$ by the winding head $A^2$ would not obtain on a recoiled first layer unless the first layer is maintained in the recoiled condition while passing through the winding head $A^2$. By positioning the recoil rolls $r^2$ between recoil rolls $r^1$ and the draft rolls $v^2$, the recoiled condition of the first layer is maintained during the application of the second layer by the winding head $A^2$. This would not obtain with the draft rolls $v^2$ immediately succeeding the winding head $A^2$ and the relief of pressure contact between the core, first and second windings would not obtain. In a similar manner each layer of the shaft is maintained in the recoiled condition during the application of the succeeding layer.

In the alternative form of apparatus which is diagrammatically illustrated in Fig. XXII, the core wire is drawn from a reel C which is mounted in a frame that revolves on or about the longitudinal axis of the machine (i. e. about the axis of the core wire) and passes in succession through the first winding head ($A^1$); the first set of recoil rolls ($r_1$); the second winding unit ($A^2$), the set of draft rolls ($v^2$); the associated set of recoil rolls ($r^2$); the third winding head ($A^3$); the third set of recoil rolls ($r^3$); the fourth winding head ($A^4$); the fourth pair of vise rolls ($v^4$); and the finished product is taken up on a drum, D, which is also mounted (like the pay off reel C) to revolve around the axis of the core wire, and which therefore constitutes the final recoil element $r^4$ of the apparatus. The successive operations which result in the production of the multiple (4) layer shaft are, in this case, the same in character as those which characterize the corresponding operations of the units $A^1$—$E^1$, $A^2$—$E^2$, $A^3$—$E^3$, and $A^4$—$E^4$, of the first described form of apparatus (Fig. XXI); but the order and arrangement of the individual elements, $v^1$, $v^2$, $v^3$, $v^4$, and $r^1$, $r^2$, $r^3$, $r^4$, are somewhat different. In this second form of apparatus the recoil, or partial uncoiling, of the first applied layer occurs between the first set of recoil rolls $r^1$ and the vise or draft rolls $v^2$; and is effected coincidently, or in conjunction, with the application of the second layer by the head $A^2$. The recoil of this second layer is effected, as before, by the conjoint action of the relatively rotating sets of rolls $v^2$ and $r^2$; but the partial uncoiling of the third layer occurs between the third set of recoil rolls $r^3$ and the final vise rolls $v^4$, at the time when the last layer is being applied by the head $A^4$. The final recoil of the outer layer is produced by the revolution of the take-up spool D around the finished product—as it issues from the vise rolls $v^4$—and this spool therefore acts, in this form of apparatus, both as a draft member, and as a recoil roll element $r^4$.

In the construction indicated in Fig. XXIII the sequential arrangement of the successive members or elements, C, $A^1$, $E^1$ ($v^1+r^1$), $A^2$, $E^2$ ($r^2+v^2$), $A^3$, $E^3$ ($v^3+r^3$), $A^4$ and $E^4$ ($r^4+v^4$); is the same as that shown in Fig. XXI, but the second holding or draft element, $v^2$, takes the form of a return pulley, which reverses the direction of axial movement of the product, and thus permits the last two winding and recoil units $A^3$—$A^4$, and $E^3$—$E^4$ to be positioned in offset parallel relationship to the first two sets of units $A^1$—$A^2$, $E^1$—$E^2$. The draft element $v^2$ may, in this case, be advantageously mounted on a weighted bell crank lever 180, so as to perform the functions, both of a holding roll, and of a constant tension device of the same general character as that shown in Fig. XVII (supra).

The arrangement diagrammatically indicated in Fig. XXIV is one which may be termed a triple return construction, in which the draft or holding rolls $v^1$ $v^2$ and $v^3$ all act as direction reversing pulleys, which permit the four winding units $A^1$ $A^2$ $A^3$ and $A^4$ to be placed side by side instead of end to end. In this case the axial order and disposition of the several operating elements, which form the successive sections of the complete shaft, are the same as in the "straight away" or tandem arrangement of Fig. XXI, or in the "two way" arrangement of Fig. XXIII. The three holding or draft rolls $v^1$ $v^2$ and $v^3$ of the last described "four way" construction, may all be advantageously mounted on elastically yielding, or weighted, tension supports, 181, 182 and 183, so as to automatically maintain each successively formed shaft section under substantially constant tension; or, more properly stated, under a substantially constant difference in tension on the two sides of each winding head.

Considered more in detail the operation of the particular form of apparatus which is shown in Figs. I—Ia, II—IIa is as follows.

The central core element, $c^1$, (which may consist of a single wire, or a plurality of wires arranged in any suitable relationship), is drawn from the core reel C at a substantially uniform rate of speed, and under a predetermined initial back pull—which is regulated and determined by any suitable device—such as the set of staggered tension rolls 185—and the first helically disposed layer of wire is applied thereto, by the rotation of the winding head $A^1$ about the axis of this core body. This forms what may be termed the first section, $s^1$, of the fabricated product S (see Fig. XXV). The tension imposed on the strand wires during this winding—which tension may be controlled and regulated while the machine is in operation by the mechanisms already described—draws the said wires into pressure contact with the underlying core body $c^1$; and subjects the latter to a relatively severe compressive force which tends to stretch or elongate the material therein, and to correspondingly increase the speed with which the wound section is discharged from the first winding head A (as compared with the speed of the entering core wire), under the pull of the first pair of draft rolls $v^1$, (40, 41), of the associated recoil unit $E^1$. The amount of this pull is adjusted by shifting the position of the driving roll 125 on the jack shaft $J^2$—which will tend to correspondingly increase or decrease the movement of the driven disc 124 and thus increase or decrease the torsion in the transmission spring 127 until the point of slip is reached—so as to establish a predetermined controllable difference between the tension on the core body and on the section $s^1$ of the fabricated product, and thereby draw the latter from the first winding unit at the desired speed. The relation between this speed and the rate of revolution of the preceding winding head will determine, in turn, the axial pitch, or the interspacial relation, of the coils of wire which form the first layer; and in order that this may be properly controlled it is necessary to provide the said winding head with the variable speed drive previously described (see Figs. XVIII to XX).

As the first wound section $s^1$ passes from the first pair of wire or holding rolls $v^1$ (40—41) to the adjacent pair of recoil head rolls $r^1$ (42—43), it is rotated or turned on its axes by the revolution of the head (54) in the same direction, (e. g. clockwise), as that in which the preceding winding unit is operating; and the tightly coiled layer of wire which was then applied, is thus partially uncoiled or "recoiled" by an amount sufficient to relieve the initial pressure contact between the said layer and the underlying core body. The amount of this "recoil" is predetermined in advance by the selection of the proper sizes of transmission gears 110 and 111; and it is not, as a rule, necessary to vary it during the operation of the apparatus in the fabrication of any given character of finished shaft.

The recoiled or partially untwisted section $s^1$ passes from the recoil unit $E^1$ through the second winding head, $A^2$, to the succeeding recoil unit $E^2$, which differs from the preceding unit E, only in having its draft rolls $v^2$ (40—41) arranged in advance—instead of in the rear—of the recoil head rolls $r^2$ (42—43) (see Figs. I and II). In passing through the winding unit $A^2$ the second layer of wire is wound on the underlying section $s^1$ in the reverse direction to that of the first layer, to form the section $s^2$ of the finished shaft (see Fig. XXV). The operation of applying this second layer differs from that of applying the first in several respects. The diameter of the underlying body, $s^1$, is substantially larger than that of the core wire $c^1$, and less force is therefore required to coil the strand wires on this larger body than is necessary to bend them around the smaller one. For this reason the necessary tension on these wires may be correspondingly reduced. This decreased tension correspondingly reduces the initial pressure contact between the underbody and the overlying layer; and this, in turn, decreases the tendency of this pressure to elongate, or change, the axial length of the superengaged elements. If the diameter of the strand wires remains unchanged, and the same interspacial relationship is maintained between successive turns of the helical layer, the relation between the longitudinal or axial movement of the product and the rate of revolution of the winding head is correspondingly increased; that is to say, there will be a larger number of turns per unit length of shafting in the second layer than in the first. But, on the other hand, the actual number of revolutions of the winding head required to lay a given number of turns on the underlying section is decreased by reason of the fact that this section is itself being turned,—by its engagement with the revolving heads of the recoil units $E^1$ and $E^2$—in a direction opposite to that in which the winding head $A^2$ is revolving; and the effective speed of winding is of course the algebraic difference—i. e. the arithmetical sum—of these two opposed movements.

A decreased tension in the strand wires—which are necessarily applied to the body on which they are wound at an angle approximating the "angle of lay", as it is termed—reduces the back pull on the surface of the underlying section; and this reduction in the back pull (which is due in part to the reduced tension of winding and in part to the smaller pitch angle of the larger coils) correspondingly decreases the necessary tension that must be exerted by the second pair of draft rolls, 40—41, in order to progress the section $s^2$ through the second winding head. On the other hand the reversal in position of the two sets of rolls, $r^2$ and $v^2$, (42—43, and 40—41) in the second recoil head, $E^2$, imposes an additional amount of work on the draft rolls, because they are obliged to pull the product through the revolving recoil elements of both the units $E^1$ and $E^2$, as well as through the winding units $A^2$.

It will now be obvious that, in the formation of the second section $s^2$ of the shaft, the tension applied to the strand wires, the rate of revolution of the winding head, and the draft applied to the product, must all be different from the corresponding factors which affect the fabrication of the first section of the product; and that, in order to properly synchronize and correlate the concurrent operations of the units $A^1$ $E^1$ $A^2$ and $E^2$, provision must be made for individually adjusting and controlling the actions and effects of each of these factors. And it will further be apparent, to those skilled in this art, that, because of the variations in the diameter, and in the physical characteristics, of the wire used in forming the successive layers, and because of variations in the frictional resistance to the movement of the various operating parts; it is also essential, or most desirable, to provide means whereby these separate adjustments may be made while the apparatus is in normal operation.

The recoil, or partial uncoiling, of the second layer, is effected in that part of the section $s^2$ which is engaged at its rear end by the rolls $r^2$ (42—43) of the revolving recoil head of the unit $E^2$, and is held against rotation at its front end by the draft rolls $v^2$ (40—41) of that unit. The amount of recoil, or untwisting, in this layer is less than that of the first layer because the initial pressure contact between it and the underlying body is reduced by the decreased tension under which it is wound, and also because the pitch angle of the helical coils is reduced by reason of the larger diameter of the underlying body. This recoil or untwisting is effected, as before, by the revolution of the roll carrying member 54 (of $E^2$) at the desired predetermined speed, which is controlled by the selection of the proper driving gears, 110 and 111.

When the amount of recoil in the second layer is less than in the first, the recoil head of the unit $E^2$ will necessarily revolve at a somewhat slower speed than the preceding head of the first unit $E^1$. This relative differential movement will produce a slight twist in the portion of the product between these two revolving members; but this small reverse twist will not substantially alter the effect of the preceding recoil movement, in relieving the pressure contact between the first layer and the core body. Its presence however accentuates the necessity for independently controllable adjustments of the concurrent and cooperative actions of the successive units $A^1$ $E^1$ $A^2$ $E^2$.

The cooperative and correlative action of the vice rolls, $v^2$ and $v^3$ (40—41) of the second and third recoil units $E^2$ and $E^3$, and of the intermediate winding unit $A^3$, corresponds very closely to that of the associated units C—$A^1$ and $v^1$ (of $E^1$);—the only difference being that the diameter of the underlying section $s^2$, on which the third layer of wire is wound, is very substantially greater than that of the core section $c^1$; and as a result of this the pitch angle of the helical coils of this third layer, and the necessary strand wire tension exercised in the winding thereof, are both much less than in the case of either the first or the second windings. These differences in operative conditions—which may be further complicated by changes in the diameter and the physical character of the strand wires used in the third layer—necessitate individual adjustments of the feeding devices, and of the rate of revolution, of the third winding head; and another individual control of the pull exercised by the third set of draft rolls ($v^3$). The recoil action on the third wire layer is effected by the revolution of the head member 54 of the third recoil unit $E^3$—which is placed in advance of the draft rolls $v^3$ (40—41) of this unit—and the amount of this recoil, or partial uncoiling, is, in this instance, somewhat less than that effected by the preceding unit $E^2$. This amount is, as before, predetermined by the selection of the proper gears 110 and 111, and does not ordinarily require to be changed during the continuous run on any given kind of flexible shafting.

The application of the fourth or outer layer of wire, to the shaft section $s^3$, is accomplished by the conjoint action of the two adjoining sets of roll elements $r^3$ and $r^4$ (42—43) of the third and fourth recoil units $E^3$ and $E^4$, and of the intermediate winding head $A^4$. The operative conditions under which this final winding is effected are substantially the same as those under which the second layer of wire is applied to the section $s^1$— (by the correlative action of the adjacent sets of roll elements $r^1$ and $r^2$ (42—43) of the recoil units $E^1$ and $E^2$, and of the interposed winding unit, $A^2$)—save that the increased diameter of the underbody ($s^3$) on which the strand wires are coiled changes the necesary tension of winding, and the necessary speed of revolution of the winding head; and these changes result, in turn, in the necessary draft or pull that should be exerted on the finished product by the take-up spool D. All of these factors must therefore be capable of individual control, and capable of separate adjustment—preferably while the apparatus is in operation—in order to obtain the most effective and satisfactory results from the practice of our process, and the use of our improved apparatus, in its entirety.

Generally stated therefore our improved mode of procedure contemplates the concurrent application of a succession of radially superimposed wire layers to a continuously moving core body, under conditions which permit of the separate and individual control of each of the essential factors that may affect the application of each individual wire layer; and further comprises the relief of the initial pressure contact between each layer and the underbody on which it is wound— prior to the application of the next succeeding layer—for the purpose of producing, in one continuous and uninterrupted operation, a flexible shaft product, which will be substantially free from internal friction (when used in a bent or curved condition), and which will also be freed to a large degree from any unbalanced stresses or strains that would tend to produce kinking or twisting when the product is removed from the take-up reel of the machine.

A further result, which is accomplished by this continuous uninterrupted mode of manufacturing multiple-layer flexible shafting, is that all of the successive operations to which the material of the shaft is subjected are performed in such immediate sequence that the effect of stresses which exceed the elastic limit do not have time to produce a permanent change in the physical characteristics of the metal in the intervals between the successive operations;—as is the case, for example, when the successive wire layers are applied one at a time, and each one is completely wound in one machine, before the next one is applied in another machine that may be operated under different conditions and at substantially different speed. It is well known that when highly elastic material is subjected to a permanent distortion—such as results from winding a layer of strand wires on a relatively small core or underbody—and is then allowed to remain in this strained condition for a considerable interval of time, the material will acquire an added degree of stiffness or resistance to further distortion or manipulation, (as evidenced by a marked discontinuity in the stress-strain diagram), and it is one of the objects and purposes of our invention to substantially eliminate this "time stiffening" effect, and thus facilitate the succesive recoil and mechanical working operations to which each progressively applied layer is subjected subsequent to its initial formation. This object and purpose is effected by the performance of the various concurrent winding and recoil operations, on the several shaft layer elements, in immediate sequence—i. e., without the lapse of any considerable length of time between the succesive actions—so that the internal stresses or strains which are produced in one operation will not have an opportunity of substantially altering the resistance of the material to further manipulation in the succeeding operations.

Having thus described our invention, we claim:

1. An improvement in the art of fabricating multi-layer flexible shafting which comprises the concurrent winding of a plurality of superimposed layers of wire in immediate sequence about a continuously progressing central core, and subjecting each layer of wire, after it has been applied to a predetermined and positive recoil action to thereby enlarge its diameter to a definite predetermined amount, and thus simultaneously relieve the initial pressure contact between all of the successively superimposed portions of the complete shaft before reeling.

2. An improvement in the art of fabricating multi-layer flexible shafting which consists in concurrently winding a plurality of helical coils, applied in continuously superimposed progression, and in immediate sequence to a central core, and relieving the initial pressure contact of winding between each coil and the underlying body, by positively twisting individual portions of the shaft including the respective windings before the ultimate reeling of any portion of shaft structure, to a definite and predetermined amount, without allowing sufficient time to intervene between successive concurrent operations to permit of time-stiffening of the material.

3. Apparatus for the manufacture of multi-layer flexible shafting which comprises the combination of a pay off spool, a take-up spool, means for progressively drawing a core body from the said pay off spool and reeling it upon the said take up spool, a plurality of positively driven winding heads arranged in close proximity to one another and adapted to concurrently wind a series of superimposed layers of wire around the said core body, and a stress relieving instrumentality associated with each head, and comprising a pair of holding devices, one of which is positively rotated about the longitudinal axis of the said layers, at a definite and predetermined speed.

4. A method for the fabrication of continuous lengths of multiple layer flexible shafting which consists in concurrently applying a series of superimposed helically wound layers of wire to a continuously progressed core body, and coincidently subjecting each successively wound layer to an independently controllable and positive recoil action, and to an individually adjustable and yielding tension, to thereby produce a finished product which has a substantially uniform interspace between the successive coils of each layer.

5. A method for the fabrication of continuous lengths of multiple layer flexible shafting which consists in concurrently winding a series of superimposed layers of wire on a central core body at a progressively varied and individually controllable speed of winding, subjecting successive sections of the product thus produced to a yielding draft tension of a variable predetermined amount, and coincidently rotating a portion of each of these tensioned sections in such direction as to enlarge the diameter of the last applied layer, to thereby relieve the initial pressure contact between said layers and produce a finished product which is substantially freed from internal friction and from the initial stresses and strains imposed therein by the winding operations.

6. In a machine for the manufacture of continuous lengths of flexible shafting, the combination of means for continuously progressing a core wire, a succession of positively driven heads for winding successively superimposed layers of wire around this core; a similar succession of positively driven recoil mechanisms, and means for accurately adjusting and predetermining the amount of recoil accomplished by each recoil mechanism, without interrupting the operation of the machine.

7. In a machine for the manufacture of continuous lengths of flexible shafting, the combination of means for progressing a core, a rotating head provided with a plurality of spools of strand wire, means for frictionally retarding the rotation of the said spools relatively to the said head, and other means operable while the head is rotating for adjusting the tension under which the said strand wires are delivered to and wound around said core.

8. In a machine for the manufacture of continuous lengths of flexible shafting, the combination of means for continuously progressing a core, a succession of winding heads each provided with a plurality of strand wire spools for winding successively superimposed layers of strand wire around this core; and means operable while the machine is in operation for independently adjusting the frictional drag on the wire as it is drawn from the said spools, and the tension subsequently imposed on the said wire as it is delivered to and wound about said core.

9. In a machine for the manufacture of continuous lengths of flexible shafting, the combination of means for continuously progressing a core wire, a succession of heads for winding successively superimposed layers of wire around this core; and means for varying the speed at which each winding head rotates independently of the speed of the other winding heads without interrupting the continuous operation of the machine.

10. In a machine for the manufacture of continuous lengths of flexible shafting, the combination of means for continuously progressing a core wire, a succession of heads for winding successively superimposed layers of wire around this core; and means for varying the rate of progression of the core between each winding head while the machine is in operation.

11. In a machine for the manufacture of continuous lengths of flexible shafting, the combination of means for continuously progressing a core wire, a succession of heads for winding successively superimposed layers of wire around this core; and means operable while the machine is in operation for varying the axial draft applied to each successively wound section of the shafting and thereby establishing and maintaing predetermined differences between the tensions imposed on successive sections.

12. In a machine for the fabrication of continuous lengths of flexible shafting the combination of means for continuously progressing a core wire through the machine, a revolvable unit for winding a helical coil of strand wire on the said core, a pair of relatively movable members mounted on the said head and adapted to engage the said strand wire and bend it between said points of engagement, and means operable while the machine is running for varying the relation between the engagement members to thereby alter the bending angle of the said wire and thus adjust the tension under which said strand wire is delivered to and wound upon the said core.

13. In a machine for the manufacture of continuous lengths of flexible shafting, the combination of means for continuously progressing a core wire, a head for winding a layer of wire around this core wire, a plate on said head with eyelets through which the wire passes as it is laid around the core, a tension sleeve through which the shafting passes after the layer is wound on the core, and means for varying the distance between the plate and the sleeve while the head is winding its layer on the core and thereby altering the tension under which the wire is laid without interfering with the continuous operation of the machine.

14. In a machine for the manufacture of continuous lengths of flexible shafting a head for winding a layer of wire around a core, means for regulating the speed of said winding head, and means for regulating the tension under which said layer is applied to the underlying body; the said speed regulating means and the said tension regulating device being capable of adjustment without interrupting the winding process.

15. In a machine for the manufacture of continuous lengths of flexible shafting a succession of heads for winding successive coils of wire around a core, means for regulating the tension under which each layer is applied to the underlying body with consequent regulation of the extent to which the core is thereby stretched, and means for varying the rate of progression of the core between each winding head to compensate for the stretching of the core.

16. In a machine for the fabrication of flexible shafting which comprises a core and a superimposed helical layer wound thereon, the combination of means for continuously progressing the core, a winding head for applying a helical layer to the core, a yielding tension device engaging the product after the helical layer has been wound on the core and adapted to maintain a predetermined axial pull thereon and means for varying the speed of the winding head by the yielding movements of the tension device.

17. In a machine for the manufacture of continuous lengths of flexible shafting a series of heads for winding superimposed layers of wire around a core, a corresponding series of recoil units each of which comprises two holding devices, one preventing and the other causing rotation of the last applied layer passing therethrough, the order of succession of said holding mechanisms being reversed after each winding head.

18. In a machine for the fabrication of multilayer flexible shafting which comprises a core and a plurality of superimposed layers of wire wound thereon, the combination of a core wire support adapted to be positively revolved about the axis of fabrication of the shaft at a predetermined speed to thereby impart an initial positive twist to said core prior to the winding of the first layer thereon, a plurality of winding units for concurrently winding the succession of superimposed layers of wire over the twisted core as the latter is progressed through the machine, and a corresponding plurality of positively driven revolvable members operatively associated with the said winding units, and adapted by their revolution about the axis of the shaft, to relieve the pressure contact between the successively wound layers thereof by a definite and predetermined amount; and means for varying the speed of revolution of each of the cooperating revolvable elements without interrupting the operation of the machine.

19. In a machine for the fabrication of continuous lengths of flexible shafting the combination of a core reel, a take up spool, a plurality of winding units interposed between said reel and spool and arranged in a plurality of parallel rows, and a yieldingly supported direction pulley interposed between each of the successive rows and adapted to maintain a predetermined adjustable tension in the portion of the fabricated product engaged thereby.

20. In a machine for the manufacture of continuous lengths of flexible shafting, means for continuously progressing a core, a rotating head for winding a layer of wire around said core, and means whereby the speed of progression of the core automatically varies the speed of rotation of the winding head.

21. In a machine for the manufacture of continuous lengths of flexible shafting, means for continuously progressing a core including draft rolls, a rotating head for winding a layer of wire around said core, and means whereby the speed of progression of the core automatically varies the speed of the draft rolls.

22. In a machine for the manufacture of continuous lengths of flexible shafting, means for continuously progressing a core including draft rolls, a rotating head for winding a layer of wire around said core, and means whereby the speed of progression of the core automatically varies the speed of the draft rolls and the speed of rotation of the winding head.

23. Apparatus for the manufacture of multilayer flexible shafting in continuous lengths which comprises a plurality of concurrently rotating winding heads arranged in close proximity to one another; frictionally driven means for continuously progressing a core body axially of said winding heads and consisting of rolls which hold said core body from axial rotation; and positively driven mechanisms, one cooperating with each pair of holding rolls and in association with each winding head for reducing the initial pressure contact between the layer of material applied by the said head and the underlying body by rotating said layer in a direction opposite to that in which it is wound whereby the pressure contact in all of the layers of coil strands is relieved prior to finally reeling any portion of the fabricated product.

24. Apparatus for the manufacture of multilayer flexible shafting in continuous lengths which comprises a plurality of concurrently rotating winding heads arranged in immediate and direct succession one after another; a recoil unit following each winding head, each unit comprising holding rolls rotating only on their own axes and other holding rolls rotating both on their own axes and as an assembly around the shaft axis, the order of succession of these two kinds of holding rolls which constitute a recoil unit being reversed between successive winding heads.

ROBERT C. ANGELL.
FRANK L. O. WADSWORTH.